No. 611,503. Patented Sept. 27, 1898.
J. N. PARKER.
CLOTHES DRIER.
(Application filed Mar. 15, 1897.)
(No Model.)
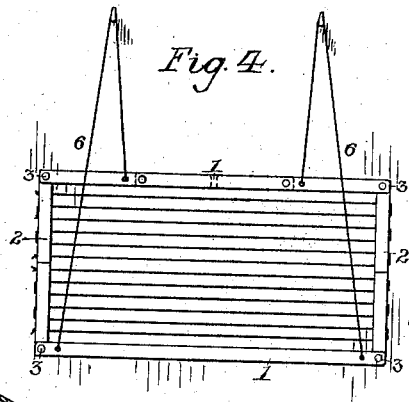
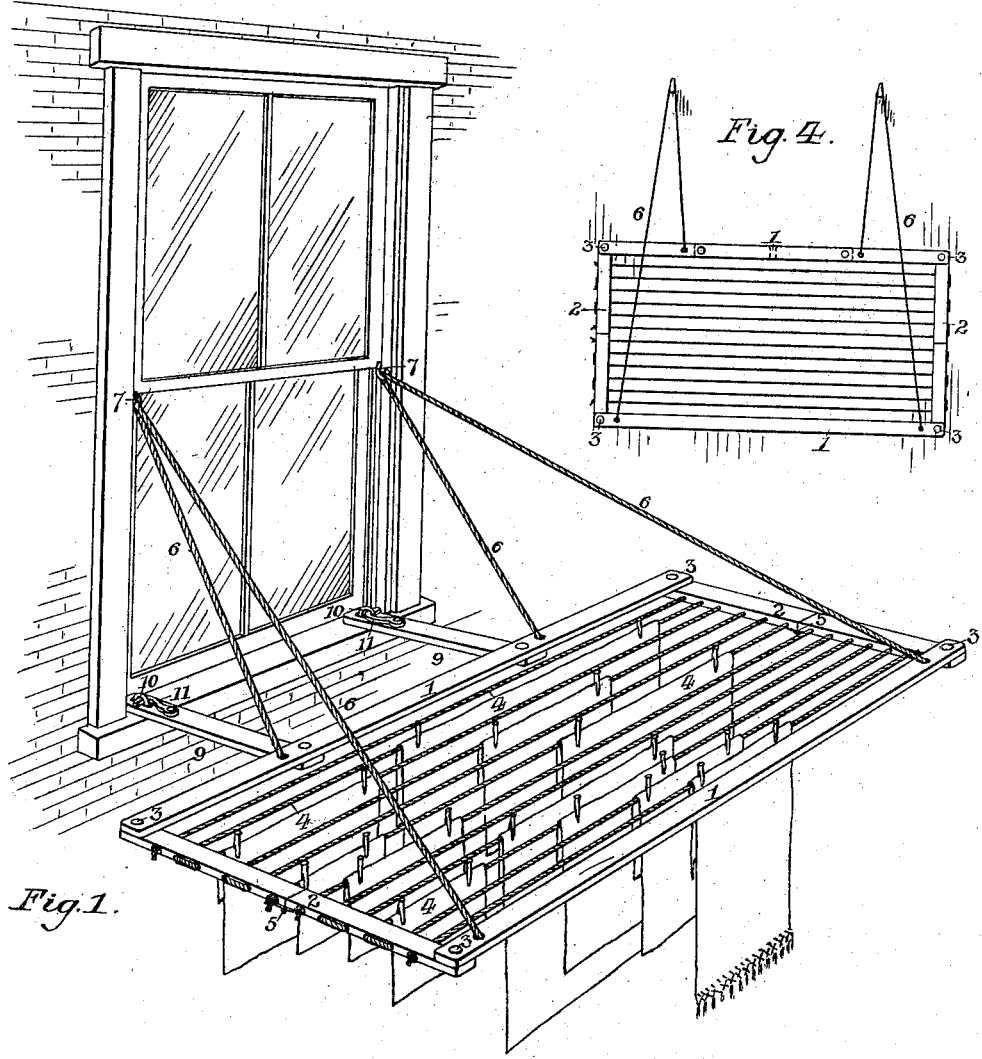
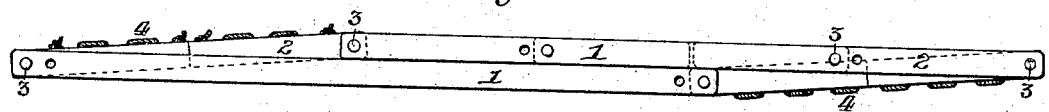
Witnesses
Charles De Cou
F. E. Bechtold
Inventor
Joseph N. Parker
by his Attorneys
Howson & Howson

UNITED STATES PATENT OFFICE.

JOSEPH N. PARKER, OF PHILADELPHIA, PENNSYLVANIA.

CLOTHES-DRIER.

SPECIFICATION forming part of Letters Patent No. 611,503, dated September 27, 1898.

Application filed March 15, 1897. Serial No. 627,591. (No model.)

*To all whom it may concern:*

Be it known that I, JOSEPH N. PARKER, a citizen of the United States, residing in Philadelphia, Pennsylvania, have invented certain Improvements in Clothes-Driers, of which the following is a specification.

The object of my invention is to provide a light, cheap, and convenient form of rack upon which clothes can be hung for drying purposes, the rack being designed to provide the maximum length of supporting-line and to occupy a minimum amount of space when not in use and being especially designed for supporting the articles to be dried outside of but within convenient reach of the window of a room or apartment, the support being such that the rack can be readily adjusted to operative position and as readily drawn in through the window either with or without its load, provision being also made for preventing the articles hung upon the rack from coming into contact with the wall outside of which the rack is supported.

In the accompanying drawings, Figure 1 is a perspective view illustrating my improved clothes-rack as it appears when in use. Fig. 2 is a view showing the rack folded. Fig. 3 is a view showing the rack folded in a different manner from that represented in Fig. 2, and Fig. 4 is a view showing the method of hanging the rack upon the wall of a room without folding the same.

The rack is composed of side bars 1 and end bars 2, pivoted together at the corners by means of rivets 3 or other available fastenings, so that the rack may be either extended into the open form, as shown in Fig. 1, or folded so that the side bars lie closely together, as shown in Fig. 2. Certain features of my invention, however, may be embodied in a rack having its bars rigidly secured together at the corners of the rack.

Extending between the end bars of the rack are a number of stretches 4 of rope or cord, which, by preference, pass longitudinally through openings in the end bars of the rack and constitute the lines for the support and suspension of the articles hung upon the rack, the passing of the rope or cord through the longitudinal openings in the end bars of the rack permitting the rack to be closely folded, as shown in Fig. 2, without causing said cords or ropes to jam or bind against each other or against the side bars of the rack.

The end bars 2 of the rack are divided centrally and are connected by hinges 5, so that instead of collapsing the rack longitudinally, as shown in Fig. 2, the rack may be folded laterally, as shown in Fig. 3, one half of the rack being doubled over upon the other half, this method of folding being adopted when the space which is to receive the folded rack is not long enough to permit of the extended folding shown in Fig. 2.

Looped suspending ropes, chains, or equivalent hangers 6 pass from the inner and outer side bars of the rack to and around hooks, pulleys, or other available supports 7 on the opposite sides of the window-frame, and in order to support the rack at such a distance from the wall that the articles hung upon the inner stretches of line will not be likely to come into contact with the wall struts 9 are pivoted to the inner bar of the rack, so that they can either be turned under the same or outward at right angles thereto, the outer ends of these struts having slots for the reception of eyes or loops 10 on the window-sill and being held in engagement with said eyes or loops by means of hooks 11 or other equivalent retainers mounted thereon.

The suspension-ropes 6 are connected to the outer bars of the rack close to the ends of the same, but to the inner bars some distance inward from said ends, this arrangement providing for a better bracing of the rack than would be effected if the connections were in line with each other.

It will be seen that the peculiar manner of connecting the suspension-ropes will effectually prevent the rack from being closed by wind-pressure or any other pressure brought on the ends or diagonally to the ends or sides when the rack is opened, as in Fig. 1, since the rope 6 on the opposite side to such pressure will brace the rack and prevent it from closing, which it would otherwise do if the ropes were secured to the rack at equal distances from the ends.

The strips or bars 1 and 2 of the frame can be made very light, and owing to the fewness of its parts and the simple means employed for connecting them the rack can be made very cheaply. The bars of the rack may be of wood or sheet metal, and in the latter case the lines 4 may be of wire, and the whole structure may be tinned, galvanized, nickel-plated, or otherwise prepared to prevent rusting.

Owing to the provision which I have made for folding the rack the latter can, if desired, be loaded inside of the room, then folded, and then passed out through the window and extended after being properly suspended from its supporting devices, and when its contents are sufficiently dried it can be again folded and drawn in through the window with its load to be hung on hooks on the wall, as shown in Fig. 4; or, if it is preferred, the rack can be suspended in its extended condition outside the window before the articles are hung upon it.

When it is not desired to project the rack beyond the wall, the struts 9 need not be unfolded, the inner bar 1 of the rack resting against or catching beneath the window-sill. The rack can also be suspended against the wall of a room or apartment when its use outside of the window is not practicable or desirable—as, for instance, in completing the drying of the articles or airing them after they have been ironed—and it occupies very little space when folded or when hung flat against the wall, as shown in Fig. 4, this being an item of importance when it is understood that a device of this class is intended mainly for the use of those living in contracted quarters.

The looped suspension-cords 6 serve to brace the rack when the same is extended, but not so rigidly as to cause the suspended articles to be injured by flapping when the wind is high.

Having thus described my invention, I claim and desire to secure by Letters Patent—

1. A suspension-rack consisting of pivoted side and end bars and looped suspension-ropes connected at one end to the inner side bar of the rack, and at the other end to the outer side bar of the same, the points of connection of the ropes to the outer bars being closer to the ends of the same than on the inner bars, substantially as specified.

2. The combination of the rack and suspending-ropes with struts pivoted to the inner bar of the rack so as to be turned at right angles thereto, said struts being slotted for the reception of retaining loops or eyes and provided with hooks or other fastenings for engaging said retaining loops or eyes, substantially as specified.

In testimony whereof I have signed my name to this specification in the presence of two subscribing witnesses.

JOSEPH N. PARKER.

Witnesses:
MURRAY C. BOYER,
WILL. A. BARR.